(12) United States Patent
Chow

(10) Patent No.: US 11,904,924 B1
(45) Date of Patent: Feb. 20, 2024

(54) MOTORISED TROLLEY

(71) Applicant: Logistics and Supply Chain MultiTech R&D Centre Limited, Pok Fu Lam (HK)

(72) Inventor: Wing Leung Chow, Pok Fu Lam (HK)

(73) Assignee: LOGISTICS AND SUPPLY CHAIN MULTITECH R & D CENTRE LIMITED, Pok Fu Lam (HK)

( * ) Notice: Subject to any disclaimer, the term of this patent is extended or adjusted under 35 U.S.C. 154(b) by 0 days.

(21) Appl. No.: 17/885,900

(22) Filed: Aug. 11, 2022

(30) Foreign Application Priority Data

Jul. 27, 2022 (HK) ............................ 32022057424.0

(51) Int. Cl.
*B62B 5/00* (2006.01)
*B62B 5/04* (2006.01)

(52) U.S. Cl.
CPC .......... *B62B 5/0056* (2013.01); *B62B 5/0073* (2013.01); *B62B 5/04* (2013.01)

(58) Field of Classification Search
CPC ....... B62B 5/0056; B62B 5/0073; B62B 5/04; B60L 15/2009; B60L 15/2018; B60L 2260/30; B60L 3/0046; B60L 7/10; B60L 7/12; B60L 7/14; B60L 7/16; B60L 7/18; B60L 7/24; B60L 7/26
See application file for complete search history.

(56) References Cited

U.S. PATENT DOCUMENTS

| 5,294,191 A | * | 3/1994 | Giorgetti | ............... B60T 13/686 303/DIG. 10 |
| 5,450,324 A | * | 9/1995 | Cikanek | ................... B60T 13/58 303/3 |
| 11,571,973 B2 | * | 2/2023 | Chung | ................... B62B 5/0073 |
| 2003/0085063 A1 | * | 5/2003 | Wakitani | ................. B60L 15/20 180/65.1 |
| 2003/0085677 A1 | * | 5/2003 | Wakitani | ............. B60L 15/2009 318/432 |

(Continued)

FOREIGN PATENT DOCUMENTS

| EP | 3858707 A1 | * | 8/2021 | ............. B62B 3/001 |
| GB | 2472392 A | * | 2/2011 | ................ B60L 7/26 |

(Continued)

*Primary Examiner* — James A Shriver, II
*Assistant Examiner* — Ian Bryce Shelton
(74) *Attorney, Agent, or Firm* — Renner, Kenner, Greive, Bobak, Taylor & Weber

(57) ABSTRACT

Respective electric drive motors (13*a*, 13*b*) drive left and right drive wheels (10*a*, 10*b*) having friction brakes, including an electromechanical service brake (31*a*, 31*b*) and an auxiliary brake (32*a*, 32*b*) mechanically biasing them to a braked state. An elongate handlebar (16) for user control is mounted via a pair of force-sensing couplings (17*a*, 17*b*) including a resilient member (18) and a load sensor (19) sensing forces applied by a user to the handlebar and transmitting respective load signals. A controller (37) receives the load signals and controls a current applied to the electric drive motors (13*a*, 13*b*) so as to amplify the force sensed by the force-sensing couplings and to generate a torque proportional to a force applied by the user to the handlebar and to actuate an electric release actuator of the auxiliary brake (32*a*, 32*b*) when the force applied by the user to the handlebar exceeds a threshold.

11 Claims, 3 Drawing Sheets

(56) References Cited

U.S. PATENT DOCUMENTS

| | | | |
|---|---|---|---|
| 2014/0246261 A1* | 9/2014 | Sekine | B60L 3/00 180/271 |
| 2018/0118245 A1* | 5/2018 | Chung | B62B 5/0043 |
| 2018/0244294 A1* | 8/2018 | Ochiai | B62B 5/004 |
| 2021/0155278 A1* | 5/2021 | Raja | B62B 5/0036 |
| 2021/0229723 A1* | 7/2021 | Sa | B62B 5/06 |
| 2021/0229725 A1* | 7/2021 | Sa | G01D 5/145 |
| 2021/0229729 A1* | 7/2021 | Lee | B62B 3/001 |
| 2022/0185117 A1* | 6/2022 | Henderson | B60L 15/2009 |

FOREIGN PATENT DOCUMENTS

| | | | | |
|---|---|---|---|---|
| KR | 20180046911 A | * | 5/2018 | |
| WO | WO-2016002067 A1 | * | 1/2016 | B62B 3/00 |

* cited by examiner

MOTORISED TROLLEY

TECHNICAL FIELD

The present invention relates to a motorised trolley, more particularly, to a motorised trolley that can be readily operated in an intuitive manner.

BACKGROUND OF THE INVENTION

Wheeled trolleys, that are manually driven, are widely used in logistics, but suffer from drawbacks that heavier loads place greater physical demands on the user, make manoeuvring more problematic, and can present a danger on a slope. Powered trolleys driven by a power source such as an electric motor and having associated controls for the drive source that are operated by switch-type input devices such as joysticks, are a solution aimed at addressing some of these issues. However, such powered trolleys present difficulties in performing delicate operations and require significant operator skill in their operation. It is an object of the present invention to overcome or substantially ameliorate the above disadvantages or, more generally, to provide an improved motorised trolley.

DISCLOSURE OF THE INVENTION

According to one aspect of the present invention there is provided a motorised trolley comprising:
  a chassis with a load platform;
  left and right drive wheels mounted to the chassis, wherein a respective electric drive motor drives each of the drive wheels;
  an electromechanical service brake on each of the left and right drive wheels;
  an auxiliary brake that mechanically biases at least one of the left and right drive wheels to a braked state;
  at least one electric release actuator for releasing the auxiliary brake;
  a receptacle adapted to receive a power source for supplying power to the drive motors, the electromechanical service brake and the at least one electric actuator;
  handle-mounting structure fixed at its lower end to the chassis;
  an elongate handlebar;
  a pair of force-sensing couplings connecting longitudinally spaced parts of the handlebar to the handle-mounting structure, each force-sensing coupling comprising a resilient member and a load sensor for sensing forces applied by a user to the handlebar and transmitting respective load signals, and
  a controller that receives the load signals and controls a current applied to the electric drive motors so as to amplify the force sensed by the force-sensing couplings and to generate a torque proportional to a force applied by the user to the handlebar and to actuate the at least one electric release actuator when the force applied by the user to the handlebar exceeds a threshold.

Preferably the auxiliary brake is mechanically biased to its braked state by a resilient member, such as a spring, accumulator, or like energy storage device.

Preferably, when the controller determines that the force applied by the user to the handlebar falls below the threshold, the controller operates both of the electromechanical service brakes.

Preferably the receptacle is disposed on the chassis, the power source is a battery mounted in the receptacle, the power source is a battery and the controller is configured, during braking of the motorised trolley, to perform regenerative braking by the drive motors.

Preferably regenerative braking is prioritised below a predetermined demand level at which the controller starts to actuate the electromechanical service brake.

Preferably the motorised trolley comprises an Inertial Measurement Unit (IMU) connected to the controller and service braking effort of the electromechanical service brakes and torque output of the drive motors are controlled to compensate for temporary changes in the load sensor signals according to the dynamics and orientation of the trolley measured by the IMU.

Preferably the motorised trolley comprises a mode-change switch connected to the controller whereby, after selection of a manual recharge mode via the mode-change switch, the controller performs regenerative braking by the drive motors when the trolley is pushed or pulled by the user to recharge the battery.

Preferably the motorised trolley comprises a free-wheeling mode that prevents electromechanical braking of the wheels and wherein, after selection of a free-wheeling operation mode via the mode-change switch, the controller actuates the at least one electric actuator for releasing the auxiliary brake.

Preferably a clutch is between each drive motor and its respective drive wheel and a clutch operator electrically actuable to release each clutch to allow free-wheeling. Alternatively, free-wheeling may be achieved by electrical switching of the motor windings.

Preferably both of the force-sensing couplings are responsive to rotation of the handlebar relative to the handle-mounting structure, whereby each resilient member is deformed by bending. Alternatively, both of the force-sensing couplings may be responsive to linear movement of the handlebar relative to the handle-mounting structure, whereby each resilient member is deformed by linear extension or compression, with the force-sensing couplings cooperating to permit rotation of the handlebar about a steering axis and differential deformation of the respective resilient members.

The invention provides a motorised trolley which is effective and efficient in operational use. The controller and drive wheels are structured in such a way that a predetermined proportion of the force necessary to move the trolley is applied by the drive wheels, with any differential producing a steering effect and with the remaining force being supplied by the user through the force-sensing couplings. The loaded trolley thus feels lighter to the user, but the user maintains a sense of pushing and pulling against both the inertial and gravitational forces originating in the loaded trolley, making for intuitive operation, while providing for safe operation on a slope.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
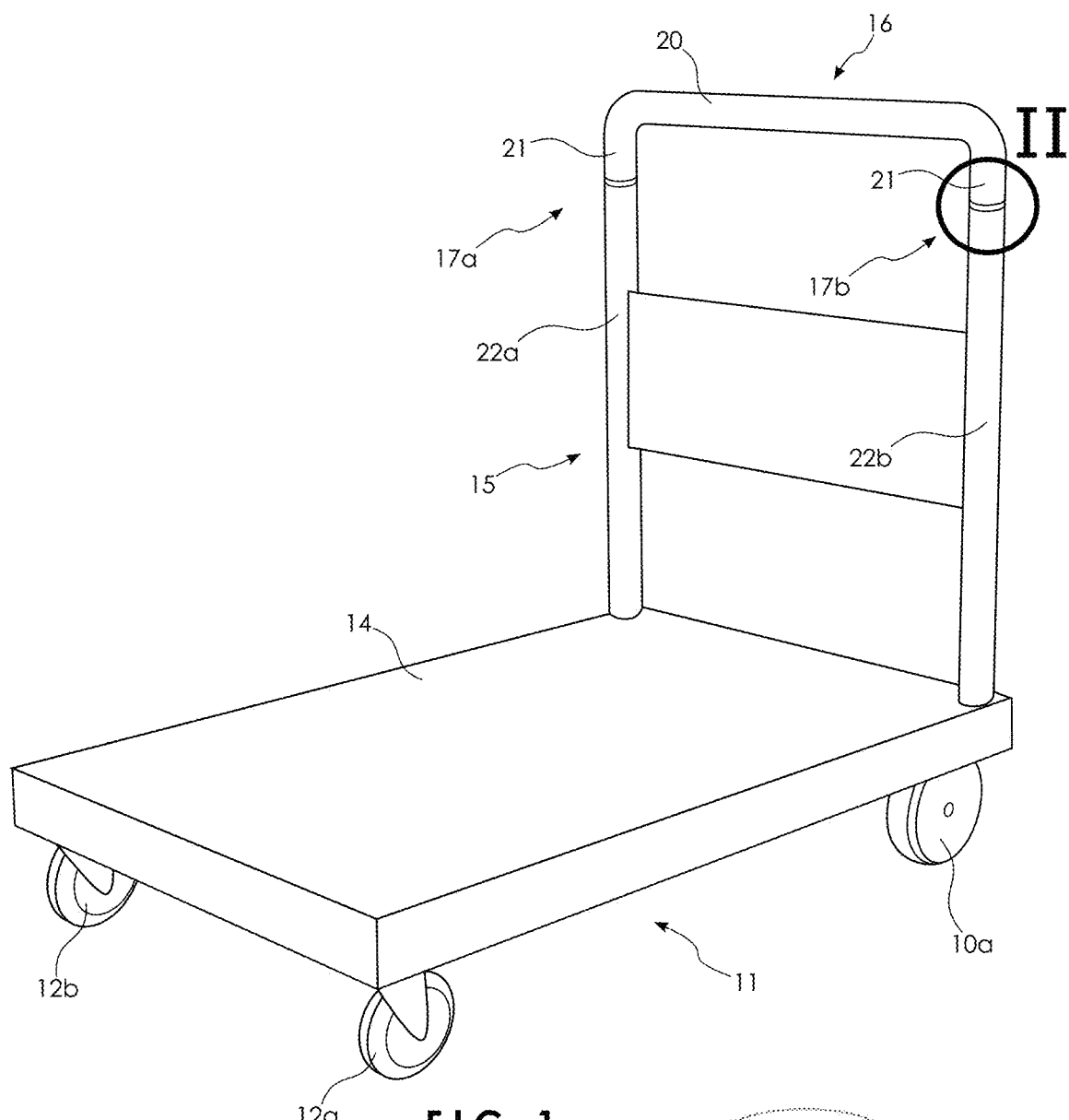
FIG. 1 is an isometric view of a motorised trolley according to a preferred embodiment of the invention.
Figure 2:
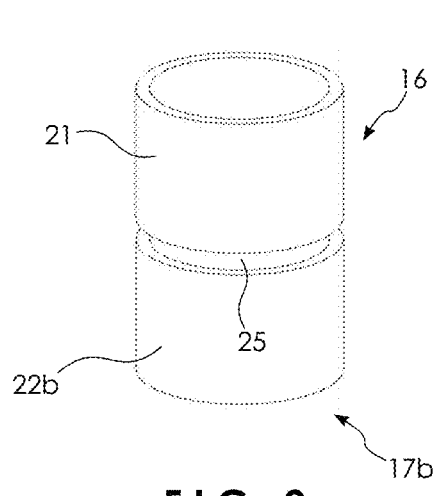
FIG. 2 is an enlarged view of detail II of FIG. 1.
Figure 3:
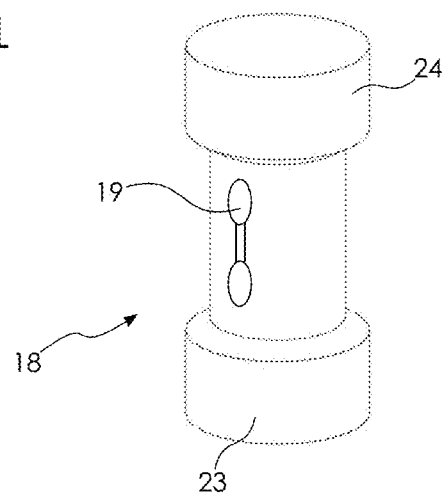
FIG. 3 is an isometric view of a force-sensing coupling for the trolley of FIG. 1.

A motorised trolley according to an embodiment of the present invention includes left and right drive wheels 10a, 10b mounted to the left and right sides, respectively, of a chassis 11. The left and right drive wheels 10a, 10b may be coaxial and mounted at the rear of the chassis 11, with castors 12a, 12b at the front. A pair of reversible electric motors 13a, 13b are provided for driving the drive wheels 10a, 10b. An object to be transported (not shown) is loaded on the chassis 11, supported on a load platform 14 and the pair of driving wheels 10a, 10b are driven by the pair of electric motors 13a, 13b to transport the object.

An upstanding handle-mounting structure 15 may be fixed at its lower end to a rear of the chassis 11. A handlebar 16, which can be held by a user, may be mounted to the handle-mounting structure 15 and elongated transversely. Accordingly, the user can grasp the handlebar 16 and apply a force as to push the trolley forward, pull it backward, or turn it.

Each one of the pair of force-sensing couplings 17a, 17b may connect an opposite end of the handlebar to the handle-mounting structure 15. Each force-sensing coupling 17a, 17b comprises a resilient member 18 and a load sensor 19 such as a pair of strain gauges 19 for sensing forces applied by a user to the handlebar 16 and transmitting respective load signals.

Each of load sensor 19 may comprise a pair of strain gauges 19 fixed to opposite sides the resilient member 18, and both disposed in a longitudinal plane, thus operating in a bending mode. Accordingly, the force-sensing couplings 17a, 17b are responsive to pushing and pulling loads applied to the handlebar by the user, i.e. the load components in a forward-and-rearward direction, which induce this bending, while the effect of loads generally perpendicular to this direction are distinguished.

The handlebar 16 may comprise a hollow structural member with a U-shape comprising an elongate central section 20, with both end sections 21 extending a short distance away from the central section 20 in a common direction, as generally orthogonally to the central section 20, to project downward in use. The handle-mounting structure 15 may comprise two stanchions 22a, 22b, aligned with the end sections 21 that are also formed by like hollow structural members.

The resilient member 18 may be in the form of a block with longitudinally opposing ends 23, 24 complementary to the internal form of the hollow structural members in which they are fixed, as with the strain gauges 19 mounted centrally between the two ends 23, 24. The resilient member 18 may be of an elastomeric member having a bending stiffness lower than that of the hollow structural members. A gap 25 between the opposing ends of the end sections 21 and the respective stanchions 22a, 22b allows a degree of relative rotation between handlebar 16 and handle-mounting structure 15.

In this manner, when a user grasps the central section 20 and applies a pushing or pulling force, the central section 20 can move relative to the handle-mounting structure 15 within a predetermined range according to the bending deformation of the resilient member 18.

Figure 4:
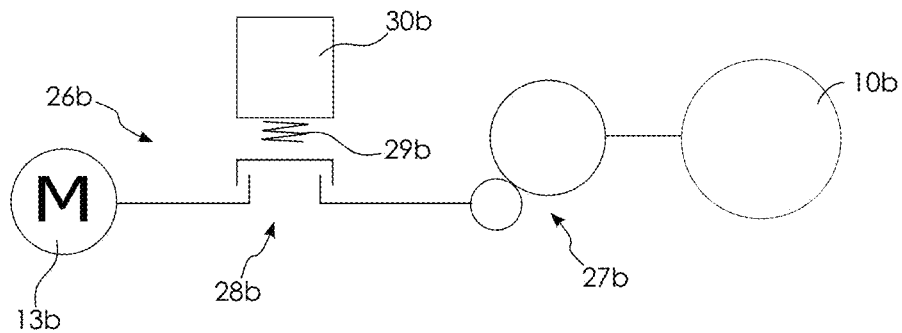
FIG. 4 is a schematic of the drive system for the right wheel for the trolley of FIG. 1.

Referring to FIG. 4, the left and right drive wheels 10a, 10b are each connected to a respective electric drive motor 13a, 13b, such as a brushless D.C. drive motor, by a respective transmission 26a, 26b. The illustrated drive assembly for the left wheel 10b is replicated for the right wheel 10a (not shown) and comprises a transmission 26b that includes a reduction gearset 27b for increasing torque output to the wheel 10b and a clutch 28b that allows each wheel to free-wheel independently of the motor. The clutch 28b may be held in a released state by a spring 29b and engaged by an electric clutch operator 30b. Of course, to achieve free-wheeling the clutch 28b need not be between the motor 13b and the reduction gearset 27b and alternatively, may be between the reduction gearset 27b and the wheel 10b.

Figure 5:
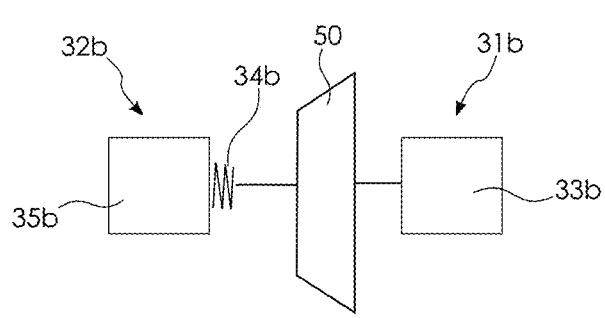
FIG. 5 is a schematic of the friction braking system of the right wheel for the trolley of FIG. 1.
Figure 6:
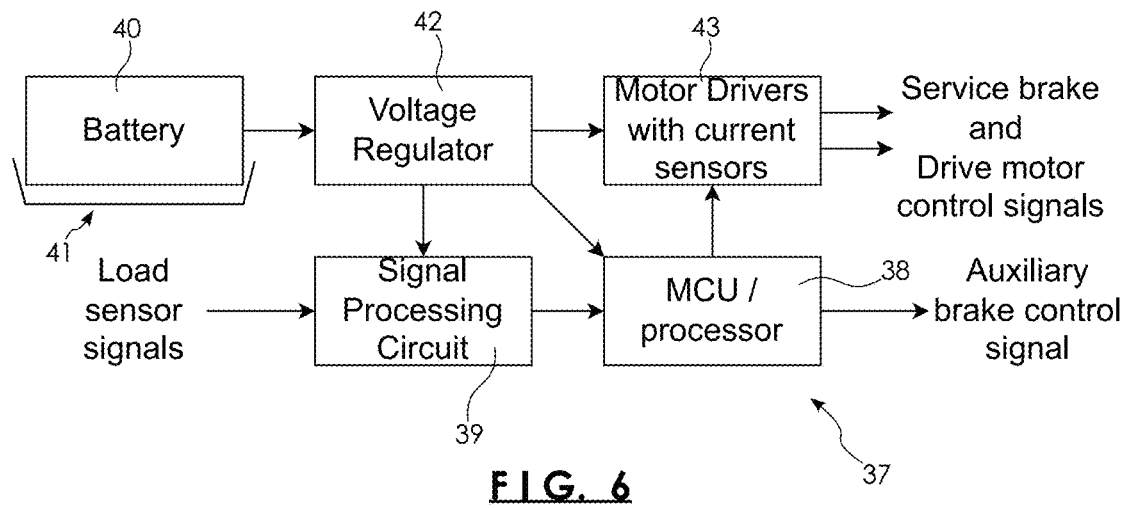
FIG. 6 is a schematic of a controller for the trolley of FIG. 1.
Figure 7:
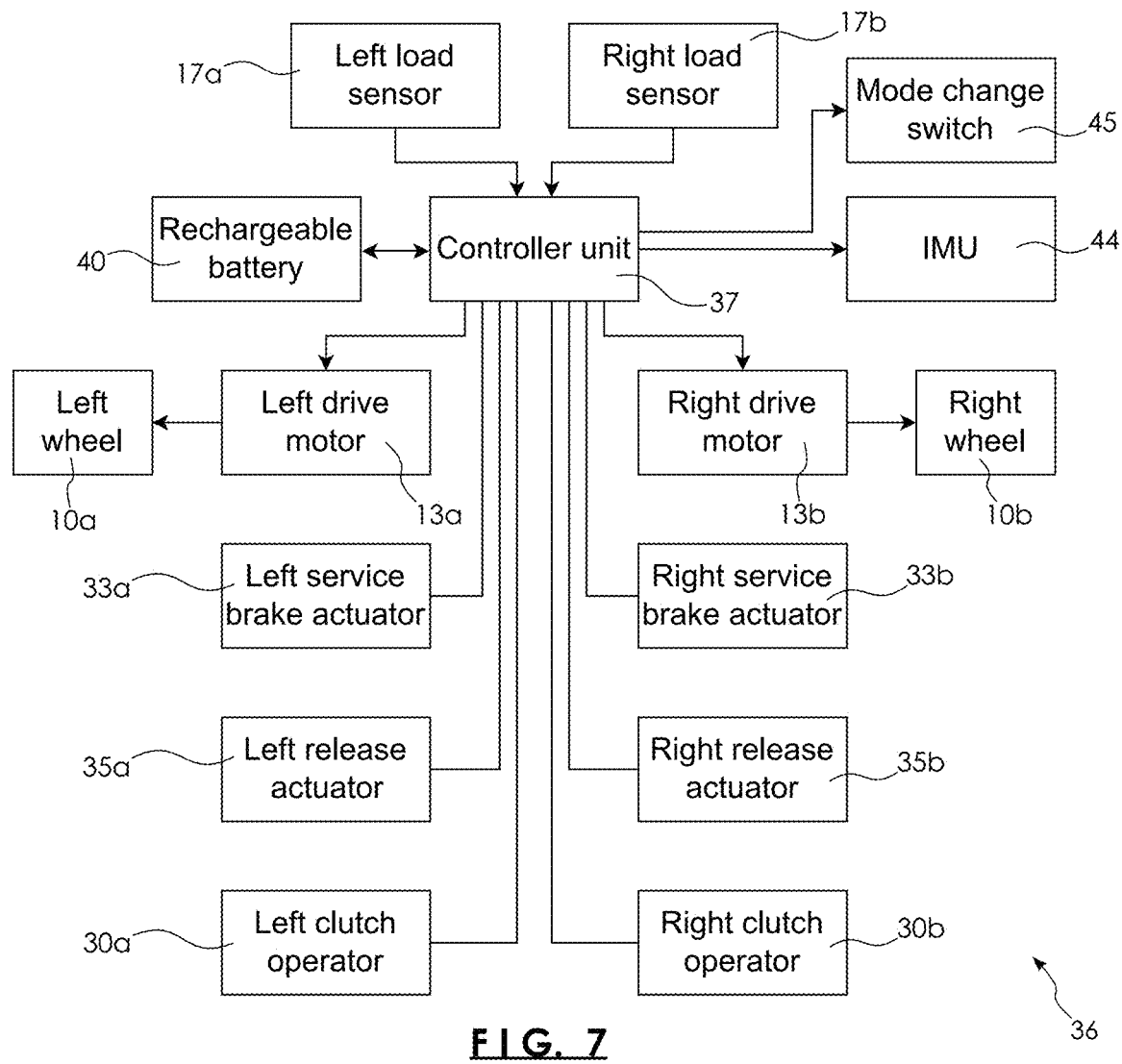
FIG. 7 is a schematic of a control circuit for the trolley of FIG. 1.

Correspondingly, FIG. 5 shows the friction braking assembly for the left wheel 10b that is replicated for the right wheel 10a (not shown in FIG. 5). The right drive wheel 10b is braked by a respective electromechanical service brake 31b and an independent auxiliary brake 32b that both act on a brake pad 50. The service brake 31b may comprise an electromagnetic service brake actuator 33b and the auxiliary brake may include a spring 34b that biases it to a braked state and an electric release actuator 35b for releasing the auxiliary brake 32b.

The load sensors 19 are connected in a control circuit 36 to transmit signals to controller 37 for controlling the driving of the pair of drive motors 10a, 10b. The controller 37 also controls the service brake 31 and auxiliary brake 32, with the service brake actuator 33 and electric release actuator 35 also connected in the control circuit 35. The controller 37 may be mounted on the chassis 11. The controller 37 comprises a microprocessor 38 that receives the load sensor signals after filtering to remove noise by a signal processing circuit 39. A rechargeable battery 40 mounted in a receptacle 41 provides power through a voltage regulator 42 for the drive motors, actuators and other components in the control circuit 36. The controller 37 may operate a PID algorithm to determine a torque demand, from which it generate a control signal to the motor driver circuits 43. The motor driver circuits 43 may use a pulse width modulation (PWM) signal to control current applied to the electric drive motors 13a, 13b so as to amplify the force sensed by the force-sensing couplings 17a, 17b and to generate a torque in response to a force applied by the user to the handlebar 16. A small force applied to the handlebar 16 by the user to push, pull or turn the trolley is amplified, and the motorised trolley is driven in the direction of the applied force, allowing simple and intuitive operation.

When the trolley is not in use in a parked state, no forces are sensed by the force-sensing couplings 17a, 17b, and the controller 37 holds both of the electromechanical service brakes 31a, 31b in a braked state in which the mechanical biasing of the auxiliary brake spring 34a, 34b is supplemented by the service braking power, providing high capacity, as for emergency braking to stop a runaway, or for holding on a steep slope. In this manner the force-sensing couplings 17a, 17b effectively provide a "dead man", whereby the trolley is braked to a halt when the handlebar is released.

A backward or forward input force applied to the trolley via the handlebar 16 can be determined by the controller 37 according to the signals. In response, once the controller 37 determines that a threshold force value has been exceed, it operates the release actuators 35a, 35b, releasing the auxiliary brakes 32a, 32b and removes power from the service brake actuators 33a, 33b to release the service brakes 31a, 31b. If both of the force-sensing couplings 17a, 17b see the same input force maintained (after compensation for orientation—discussed further below), the controller 37 controls the current to apply equal current to the right drive motor 13a and left drive motor 13b and so as to amplify the input force (e.g. a 10 times amplification as determined by an adaptive gain algorithm) driving both drive motors simultaneously, providing an amplified output force on the trolley, as to move the trolley straight backward or forward in the direction of the input force when starting from a stationary position on a horizontal plane.

Likewise, when different forces are sensed by the load sensors, different currents are applied to the left and right drive motors, the input force is amplified accordingly, and differential steering results from the application of more drive torque at one side of the trolley than at the other.

The control circuit 36 may also include an Inertial Measurement Unit (IMU) 44 connected to the controller 37 for determining the dynamics of the trolley and its orientation. The output signal from the IMU 44 may be used to compensate for effects, associated with trolley orientation and dynamics, that would otherwise risk producing unwanted responses. For instance, when the controller 37 ascertains from the IMU 44 that the trolley is in motion, relatively short duration changes in the load sensor signals can occur without intentional control input change made by the user, as according to changes in path curvature, obstacles in the path or the gait of the user. By identifying and compensating for these conditions, abrupt changes in driving and braking are avoided and smooth continuous operation can be achieved. Likewise, data from the IMU 44 sent to the controller 37 allows compensation to be made for cases where the orientation of the trolley affects the output of the sensors, as on a slope the known weight of the handlebar 16 may produce a non-negligible sensor output.

Accounting for the IMU 44 signal, the controller 37 can determine when there exists a demand for braking, the controller 37 then controls blended operation of friction braking and regenerative braking. A force input at the handlebar 16 that demands braking is initially met by the drive motors 13a, 13b with regenerative braking, the amount of which is measured by the IMU 44. Regenerative braking is prioritised below a predetermined demand level at which the controller 37 starts to actuate the electromechanical service brakes 31a, 31b.

An adaptive gain learning algorithm may control the driving and braking, or the level of amplification of the user control input as measured by the load sensors 19. For instance, an Artificial Intelligence or Bayesian learning algorithm for adaptive gain control may be derived in which the gain is adjusted during the learning process.

The control circuit 36 may further comprise a mode change switch 45 mounted, for instance, to the handlebar 16 for actuation by the user to select a mode of operation of the trolley. The state of the mode change switch 45 is monitored by the controller 37 and successive actuations of the mode change switch 45 may cycle through a change from an operating mode, as described above, to a free-wheeling mode, and to a manual charging mode, as described hereinbelow.

In the free-wheeling mode, the trolley may be readily pushed or pulled by the user without electromechanical braking of the wheels 10a, 10b. After selection of a free-wheeling mode via the mode-change switch 45, the controller 37 actuates the electric actuators 33a, 33b for releasing the auxiliary brakes 32a, 32b and the clutch operators 30b for releasing the clutches 28a, 28b, to place the trolley in the free-wheeling mode.

In the manual recharge mode, the trolley may be pushed or pulled by the user with the motor operating as a generator to recharge the battery. In other words, in the manual recharge mode, the force-sensing couplings 17a, 17b may be deactivated, or their output disregarded by the controller 37. After selection of the manual recharge mode via the mode-change switch 45, the controller 37 actuates the electric actuators 33a, 33b for releasing the auxiliary brakes 32a, 32b.

Aspects of the present invention have been described by way of example only and it should be appreciated that modifications and additions may be made thereto without departing from the scope thereof.

The invention claimed is:

1. A motorised trolley comprising:
a chassis with a load platform;
left and right drive wheels mounted to the chassis, wherein a respective electric drive motor drives each of the drive wheels;
an electromechanical service brake on each of the left and right drive wheels;
an auxiliary brake that mechanically biases at least one of the left and right drive wheels to a braked state;
at least one electric release actuator for releasing the auxiliary brake;
a receptacle adapted to receive a power source for supplying power to the drive motors, the electromechanical service brake and the at least one electric actuator;
handle-mounting structure fixed at its lower end to the chassis;
an elongate handlebar;
a pair of force-sensing couplings connecting longitudinally spaced parts of the handlebar to the handle-mounting structure, each force-sensing coupling comprising a resilient member and a load sensor for sensing forces applied by a user to the handlebar and transmitting respective load signals, and
a controller that receives the load signals and controls a current applied to the electric drive motors so as to amplify the force sensed by the force-sensing couplings and to generate a torque proportional to a force applied by the user to the handlebar and to actuate the at least one electric release actuator when the force applied by the user to the handlebar exceeds a threshold.

2. The motorised trolley of claim 1 wherein the auxiliary brake is mechanically biased to its braked state by a resilient member.

3. The motorised trolley of claim 1 wherein when the controller determines that the force applied by the user to the handlebar falls below the threshold, the controller operates both of the electromechanical service brakes.

4. The motorised trolley of claim 1 wherein the receptacle is disposed on the chassis, the power source is a battery mounted in the receptacle, and the controller is configured, during braking of the motorised trolley, to perform regenerative braking by the drive motors.

5. The motorised trolley of claim 4 wherein regenerative braking is prioritised below a predetermined demand level at which the controller starts to actuate the electromechanical service brake.

6. The motorised trolley of claim 3 wherein the receptacle is disposed on the chassis, the power source is a battery mounted in the receptacle, and the controller is configured, during braking of the motorised trolley, to perform regenerative braking by the drive motors, wherein the regenerative braking is prioritised below a predetermined demand level at which the controller starts to actuate the electromechanical service brake.

7. The motorised trolley of claim 1 further comprising an Inertial Measurement Unit (IMU) connected to the controller and service braking effort of the electromechanical service brakes and torque output of the drive motors are controlled to compensate for temporary changes in the load sensor signals according to the dynamics and orientation of the trolley measured by the IMU.

8. The motorised trolley of claim 1 wherein, the motorised trolley comprises a mode-change switch connected to the controller whereby, after selection of a manual recharge mode via the mode-change switch, the controller performs regenerative braking by the drive motors when the trolley is pushed or pulled by the user to recharge the battery.

9. The motorised trolley of claim 8 wherein the motorised trolley comprises a free-wheeling mode that prevents electromechanical braking of the wheels and wherein, after selection of a free-wheeling operation mode via the mode-change switch, the controller actuates the at least one electric actuator for releasing the auxiliary brake.

10. The motorised trolley of claim 1 wherein a clutch is between each drive motor and its respective drive wheel and a clutch operator electrically actuable to release each clutch to allow free-wheeling.

11. The motorised trolley of claim 6 further comprising:
an Inertial Measurement Unit (IMU) connected to the controller and service braking effort of the electromechanical service brakes and torque output of the drive motors are controlled to compensate for temporary changes in the load sensor signals according to the dynamics and orientation of the trolley measured by the IMU;
a mode-change switch connected to the controller whereby, after selection of a manual recharge mode via the mode-change switch, the controller performs regenerative braking by the drive motors when the trolley is pushed or pulled by the user to recharge the battery, and
a free-wheeling mode that prevents electromechanical braking of the wheels and wherein, after selection of a free-wheeling operation mode via the mode-change switch, the controller actuates the at least one electric actuator for releasing the auxiliary brake.

\* \* \* \* \*